Jan. 4, 1927.  
C. CHISHOLM  
1,612,907
EMBOSSING DIES
Filed March 9, 1925
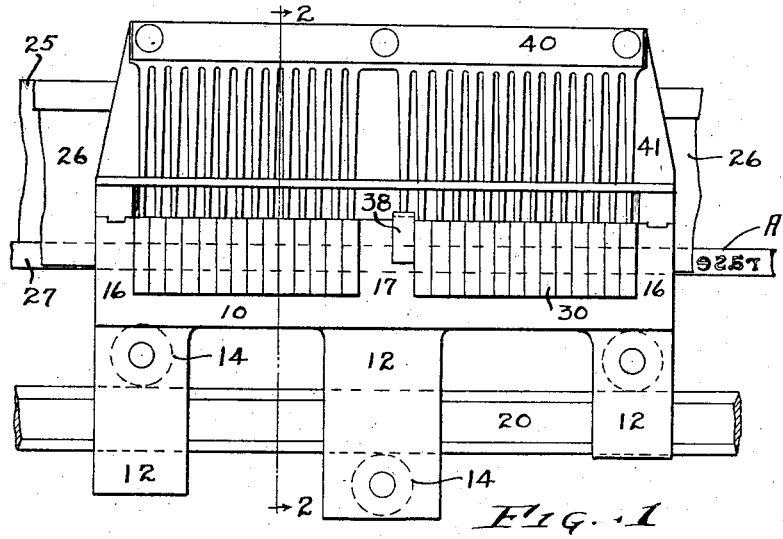
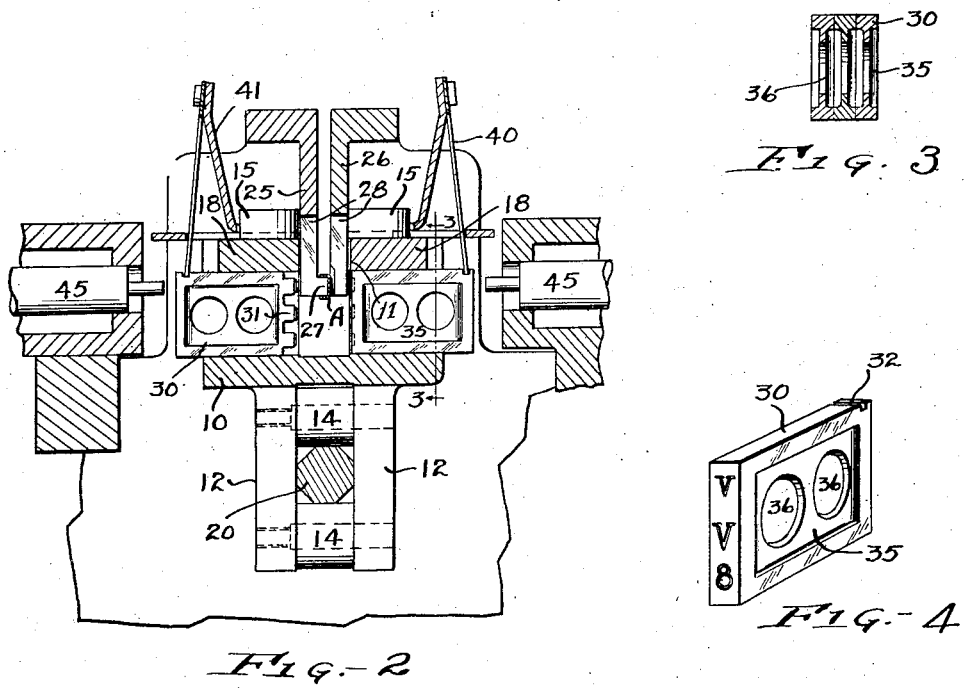
Inventor  
Clifton Chisholm  
By Bates, Macklin, Goodrich & Teare  
Attorneys Patented Jan. 4, 1927.

1,612,907

UNITED STATES PATENT OFFICE.

CLIFTON CHISHOLM, OF CLEVELAND, OHIO, ASSIGNOR TO THE AMERICAN MULTIGRAPH COMPANY, OF CLEVELAND, OHIO, A CORPORATION OF OHIO.

EMBOSSING DIES.

Application filed March 9, 1925. Serial No. 14,008.

My prior application No. 535,311 filed February 9, 1922, shows an embossing machine having a reciprocatory die head in which are mounted two rows of individually movable die blocks, provided respectively with male and female dies on their opposed ends. A plunger mechanism causes the selected die blocks to approach each other to embossed interposed material. The die blocks in that application have guiding ribs along their upper and under edges occupying corresponding grooves in the die head.

Now, I have found that the accurate machining of the guiding ribs on the die blocks and the corresponding grooves in the die head entails considerable expense which may be avoided if the ribs and grooves are omitted and the set of die blocks mounted in an open frame, each block rubbing against its neighbor. Such a construction, by avoiding the clearance between adjacent die blocks has the further advantage of somewhat reducing the length of the die head. I find, however, that when selected die blocks, having continuous flat faces, lie against each other, the adhesion is so great as to require undue power to the blocks and furthermore there is likelihood that any block will drag the adjacent block or blocks along with it.

I have discovered that I can obtain the advantages of plain rectangular abutting blocks, without the disadvantages specified, by recessing the side walls of the blocks. I also find that by making holes through the internal webs of the blocks I aid in the desired even tempering of the blocks, and in preventing cracks and strains. These holes also lighten the blocks, ventilate them, and perhaps tends to relieve any air drag of one block on its neighbor. Such recessed and perforated blocks may be mounted snugly side by side in an open frame, each block being readily operable independently of its neighbors, as desired. Such die blocks constituting the subject matter of this application, are illustrated in the drawings hereof and hereinafter more fully explained.

In the drawings Fig. 1 is a side elevation of a reciprocatory die head carrying die blocks made in accordance with my invention; Fig. 2 is a cross section through such die head, as indicated by the line 2—2 of Fig. 1; Fig. 3 is a cross-section parallel with the plane of Fig. 1 through three adjacent die blocks, the plane of the section being indicated by the line 3—3 of Fig. 2; Fig. 4 is a perspective of one of the die blocks.

As shown in Figs. 1 and 2, 10 indicates a reciprocatory die head comprising a body having a vertical longitudinal slot 11 extending downwardly from its upper surface and having depending legs 12 by which it is guided along a suitable guide bar 20. The legs are shown as carrying rollers 14 engaging upper and under surfaces of the bar 20. The longitudinal slot 11 in the die head enables this head to straddle stationary frame bars 25 and 26. The former plate is shown as having a ledge 27 at this lower edge which may carry a channel-shaped ribbon of metal A adapted to be embossed, this ribbon being guided by the face of the other frame bar 26. The die head is shown as having rollers 15 engaging opposite outer faces of these frame bars.

Within the die head are open rectangular spaces for the groups of die blocks. The spaces are bounded on their under sides by the flat top of the body 10 at their ends by the end portions 16 and an intermediate partition 17 of the body, and at their tops by the flat underface of the horizontal bars 18 of the die head.

In the open spaces provided as described, there are mounted rows of die blocks 30, these die blocks being of the general rectangular shape shown and mounted side by side in contact with each other. The die blocks mounted in the left hand portion of the die head as viewed in Fig. 2, have on their right hand end projections 31 on which are formed male dies. The right hand rows of die blocks have mounted on their left-hand ends corresponding female dies. Each die block is shown as provided with a notch 32 into which extends the lower end of a spring 40. These springs are tines of a comb mounted on brackets 41 secured to the die head and serve to keep the die blocks normally withdrawn in the position shown in Fig. 2.

That pair of die blocks which is brought into operative position by the shifting of the die head stands directly between a pair of plungers 45 which may then be caused to approach each other to shove selected die blocks inwardly, whereupon a projection 31 of the rear die block enters the channel of the ribbon A and the female face of the opposed die block stands against the face of the ribbon, so that the character is embossed on such ribbon. It is to be understood that at this selected position, the frame bars 25 and 26 are cut away, as shown at 28, to enable the die blocks to emboss the ribbon.

Each of the die blocks is shown as having three related characters on its face, either one of three sets being rendered active by the shift mechanism not shown. Fig. 1 indicates at 38, one of the members of a pair of shearing dies adapted to cut off the embossed ribbon as explained in my application heretofore mentioned.

To enable the die blocks to rest snugly against each other side by side without causing the undue adhesion, which even though the die blocks are hardened and smoothed, might be very troublesome, I reduce the area of engagement by recessing the sides of each die block with a rectangular recess shown at 35, giving the die block substantially an I-shape in cross-section. These die blocks must be very hard, they must have their engaging side surfaces very smooth. I find that they can be better tempered to give them these characteristics if holes are made through the web. Such holes also lighten the blocks without materially reducing their strength. They also serve to ventilate the members and may have the effect of relieving the suctional dragging effect of one block on its neighbor. At all events, I find that when the blocks are recessed on their sides and have two circular openings through the webs, as shown at 36 in the drawings, that a perfectly satisfactory operation is obtained.

By reason of the die blocks being hardened and the border portions of their sides being very smooth they fit so closely together that the set occupies the entire space provided in the die head and there is practically no clearance between adjacent blocks. Notwithstanding this, my experience shows that such recessed and perforated blocks, mounted snugly side by side as shown in the drawings, will operate freely and easily and independently of each other, and will accurately perform the embossing operation. I thus make a simpler and cheaper construction.

I claim:

1. The combination of a die head having a pair of opposed open spaces, two rows of die blocks mounted in said spaces respectively and equipped on their opposed faces one with male dies and the other with female dies, said die blocks being freely mounted in said spaces without guiding ribs and rubbing against each other at their sides, said sides being recessed to leave only a border portion in engagement.

2. The combination of a reciprocatory die head having a pair of opposed open spaces, two rows of die blocks freely mounted in said spaces respectively and equipped respectively with male dies and female dies on their opposed faces, said die blocks rubbing against each other and each recessed at its side.

3. The combination of a reciprocatory die head having a pair of opposed cavities, two rows of die blocks freely mounted in said cavities respectively and equipped respectively with male dies and female dies on their opposed ends, said die blocks rubbing against each other at their sides, the opposite sides of the central region of each block being recessed to make each block substantially I-shaped in cross-section.

4. The combination of a reciprocatory die head having a pair of opposed open cavities, two rows of die blocks mounted in said cavities respectively and equipped one with male dies and the other with female dies on their adjacent ends, said die blocks being freely mounted in said cavities without guiding ribs and rubbing against each other with their sides, said sides being recessed to make each block substantially I-shaped in cross-section and one or more holes through the internal webs of the blocks.

In testimony whereof, I hereunto affix my signature.

CLIFTON CHISHOLM.